3,761,284
PRODUCING AN EXTRUDED CHEESE PRODUCT IN SNACK SIZED FORM
Herbert G. Foster, Jr., Hazel Crest, and Charles D. Frederick, Western Springs, Ill., assignors to Swift & Company, Chicago, Ill.
No Drawing. Filed Nov. 9, 1971, Ser. No. 197,150
Int. Cl. A23c 19/12
U.S. Cl. 99—117                               9 Claims

ABSTRACT OF THE DISCLOSURE

An improved method for producing a cheese product in a novel snack sized form is disclosed whereby individual snack sized pieces of a cheese product are formed without the use of molds, casings and the like. An initially heated plastic cheese formulation is rapidly and evenly cooled, with agitation, under a high pressure of between about 165 to 195 p.s.i.g. to a sufficiently solid self-sustaining condition throughout, and is extruded and cut into snack and/or bite size pieces which have compacted homogeneous textures and smooth, glossy appearances. The cooling under the prescribed high pressure and simultaneous agitation are required to promote an even reduction of temperature throughout the product and to provide the desired compacted homogeneous texture.

---

This invention relates to the food art and more particularly pertains to an improved method for the continuous preparation of a snack food item of cheese in a novel snack sized form.

Cheese products have enjoyed wide consumer acceptance for many years and have been particularly popular as snack food items. Most of these snack food items are made of process cheese products. Generally, process cheese products are prepared by pouring or stuffing a heated plastic mixture of ground cheese curds, emulsifiers, salts, etc., into molds or casings whereby the product retains the form of the mold or casing upon cooling and hardening. Usually the process cheese products are produced and marketed in brick-like, cylindrical or sliced form of a fairly large size and volume, for instance, in bricks or loaves of about ¼ to 5 pounds in weight. Thus, if the consumer desires to utilize these presently marketed process cheese products as snack food items, he must slice a large block of product to snack or bite sized pieces. This is a time consuming inconvenience to the consumer.

There are a few cheese products which are prepared in snack or bite sized form that are available to the consumer. These products generally are prepared by slicing or punching snack sized pieces from large blocks or tubes of product previously cooled in molds and removed therefrom. A particular example of such a process comprises stuffing heated plastic cheese into a casing, cooling and hardening the product therein, removing the casing, and slicing the hardened bar of product into snack sized pieces. It will be noted though that the additional steps required to prepare snack sized pieces of product from a previously molded block of product requires the use of additional labor, materials, etc., which increase production costs. Thus, snack sized cheese products presently available to the consumer are expensive and are usually marketed as specialty food items.

Of course, a cheese product in snack sized form may be prepared by cooling and hardening the heated plastic product in molds of snack or bite size. However, it would appear that such a process would be economically infeasible, particularly for large volume production.

On the other hand, we have discovered a method for continuously producing a cheese product in a novel snack sized form which is economical and provides a product which is most convenient to the consumer. The snack size pieces of cheese product are prepared without the use of molds or casings and without a loss of favorable appearance and texture.

Hence, it is an object of the present invention to provide an improved method for preparing a snack food item comprised of cheese in a novel snack and/or bite sized form which is economically feasible and provides convenience to the consumer.

It is another object of the instant invention to provide an improved method for producing individual snack and/or bite sized pieces of a cheese product whereby each individual piece has a neat, smooth surface appearance and a solid compacted homogeneous texture which is cooled evenly throughout.

It is yet another object of the present invention to provide an improved method for preparing snack sized pieces of a cheese product whereby a heated plastic cheese mass is formed into snack and/or bite sized pieces without the use of molds, casings and the like.

It is a further object of the present invention to provide an improved method for producing a cheese product in a snack and/or bite sized form whereby a heated plastic cheese mass is rapidly and evenly chilled or cooled under high pressure, with agitation, to a sufficiently solid self-sustaining condition throughout and is extruded in a compacted homogeneous condition suitable for cutting into snack sized pieces without malformation thereof.

It is still a further object of this invention to provide an improved method for producing snack and/or bite sized pieces of a cheese product whereby a cheese formulation, which has been initially heated and rapidly cooled while being simultaneously agitated and subjected to a pressure of between about 165 to 195 p.s.i.g., is extruded through an orifice of a size which is sufficiently small to provide a bar of solidified proudct having a cross-section size that will provide pieces of product which are consumable in one or a few bites upon the cutting thereof.

It will be understood that by the use of the terms and claims we mean to include any and all types of cheese and cheese product throughout this specification cheeses and blends of differing varieties of cheese which can be melted to a plastic or semi-plastic condition, when subjected to elevated temperatures, sufficiently to be extruded through an orifice. Moreover, the terms are meant to encompass all cheese blends or formulations commonly classified and recognized as a process cheese, process cheese food and/or process cheese spread.

Generally, the instant invention comprises the steps of rapidly and evenly cooling a heated plastic cheese formulation under a high pressure of between about 165 to 195 p.s.i.g., with agitation, until the product is sufficiently self-sustaining throughout to maintain shape and form. The cooled mass is then extruded through an orifice of up to 2 inches in size, to form a solid compact bar of product having a corresponding cross-section or diameter. Finally, the bar of product is cut into snack sized pieces which are consumable in one or a few bites. The resulting snack size pieces of product are of a compact, homogeneous composition and are cooled evenly throughout. Each piece exhibits a smooth, glossy surface which is neat to the touch.

It will be understood that extruding cheese initially heated to a plastic condition to form a solid bar of product is old in the art. U.S. Pat. No. 2,228,492, issued to Wetherbee, discloses such a process wherein heated cheese is a plastic condition is cooled to bring about a gradual solidification thereof and is expelled through an orifice in the form of an elongated bar of hardened product which may be subsequently cut into blocks and wrapped. However, we have discovered that, in order to produce a bar of cheese product in a compact form which is sufficiently self-sustaining completely throughout to maintain its shape and which has a diameter or cross-section sufficiently small so that it can be cut into individual snack or bite sized pieces that are consumable in a few bites, it is mandatory that the heated plastic cheese mass be subjected to a pressure of between 165 to 195 p.s.i.g. and simultaneously agitated as it is being cooled. The critical steps of the instant invention will be more particularly discussed hereafter.

A cheese product utilized in the present invention is initially prepared by heating it at a temperature somewhat below the boiling point of water to provide a plastic or semiplastic condition which can be pumped and extruded. Usually the cheese is initially heated to a temperature within the range of between about 155–165° F. which has been generally recognized to be a temperature sufficient to effect the pasteurization thereof. However, it is pointed out that the present invention can be performed by utilizing cheese which has been heated to a lesser temperature, so long as the heating is sufficient to provide a plastic condition to the product.

The initially heated plastic cheese is first rapidly and evenly cooled or chilled, with agitation, under a pressure of between about 165–195 p.s.i.g. to sufficiently solidfy the mass throughout to a self-sustaining condition. In this self-sustaining condition, the cheese is sufficiently solid and evenly cooled throughout to maintain shape and form but is still sufficiently plastic to permit the extrusion thereof. We have observed that the desired self-sustaining condition can be provided by rapidly and evenly cooling the heated plastic mass under the above conditions until the product reaches a temperature of between about 70–85° F. and preferably between about 75–80° F. If the plastic cheese mass is cooled to a temperature above about 85° F. it is not sufficiently self-sustaining and upon subsequent extrusion, the resultant product is undesirably mushy and exhibits a separation of butter fat from the protein of the mass. Accordingly, if the product is cooled to a temperature below about 70° F., the resultant extruded product is undesirably grainy and does not have the desired compacted homogeneous texture.

It is most critical in the practice of the instant invention to rapidly and evenly cool the initially heated plastic cheese mass to the sufficiently solid self-sustaining condition under a high pressure of about 165–195 p.s.i.g. so as to obtain a product of satisfactory density and homogeneous texture. We have found that if the plastic mass is cooled to the preferred temperature range while subjected to a pressure below 165 p.s.i.g., it is most difficult to subsequently extrude the self-sustaining mass through an orifice having a size sufficiently small to provide a continuously solid bar of product which can be cut into bite sized pieces. The resultant extruded product has a very low density, and it is most difficult to subsequently cut into individual snack size pieces without malformation thereof. Furthermore, we have discovered that if the plastic cheese mass is cooled to within the preferred temperature range while subjected to a pressure above about 195 p.s.i.g. the product tends to be too compacted which in turn is very difficult to extrude. On the other hand, when the heated plastic cheese mass is rapidly and evenly cooled under the above-described range of pressure, the self-sustaining mass can be extruded to form a thin bar of product having an even distribution of butterfat therethrough and is sufficiently compacted and evenly cooled throughout to withstand subsequent cutting and packaging without malformation.

It is also essential in the practice of the instant invention to simultaneously agitate the initially heated plastic cheese mass as it is being cooled under the above-described pressure. The simultaneous agitation during cooling provides an even reduction of temperature throughout the entire mass of product so that when the product is further processed, there is no malformation thereof due to temperature variations within the product. Moreover, the simultaneous agitation mixes the cheese formulation during cooling which retards or inhibits the separation of butterfat globules from the protein mass and reduces the processing time required to cool the heated plastic product evenly throughout to within the desired temperature range.

As pointed out hereinbefore, after the cheese product has been sufficiently cooled to provide a self-sustaining condition throughout it is extruded through an orifice to form a continuous compacted bar of product. The cheese product may be extruded through an orifice of any desired shape such as circular, square, etc. However, in order to produce the desired snack or bite sized pieces it must be extruded through a small orifice of up to about 2 inches in size. This forms a bar of product having a corresponding cross-section size which is sufficiently small enough to provide the snack or bite sized pieces of product upon the cutting thereof. Preferably, we extrude the cheese mass through an orifice of about ¼ to 1½ inches in size.

The extruded compacted bar of product is then cut to any desired length to form snack size pieces. Preferably, the bar of product is cut into bite size pieces which are small enough to be consumed in a few bites, for example, about ½ to 1½ inches in length.

The individual snack size pieces of product can then be packaged in any manner known in the art. In view of the size of each particular snack sized piece of product, it is desirable to package a plurality of pieces in a single package, to provide convenience to the consumer. The snack size pieces of product are more easily packaged, either by hand or by machinery, if after the cutting operation the pieces are tempered to reduce the temperature thereof. As was pointed out hereinabove, the processed cheese product is preferably cooled to a temperature of between about 70–85° F. The product will maintain its shape within this temperature range but is still somewhat soft and can be deformed by excessive handling. Hence, we prefer to temper the product, such as by subjecting it to a blast of chilled air, to further reduce the temperature thereof approximately 1–10° F. prior to packaging.

In the practice of the instant method, we have found that superior results can be obtained by pumping the initially heated plastic cheese product through appropriate conduits into a scraped-surface heat exchange device and extruding the cooled product through a valve-controlled orifice. An example of a heat exchange device which we have found most satisfactory is one manufactured by the Cherry-Burrell Corporation under the trade name of Thermutator. This device is comprised of a stainless steel inner tube which is provided with a surrounding enclosed cooling jacket. The cooling jacket is connected by a conduit to an independent refrigerating unit. A refrigerant is circulated from the refrigerating unit to between the jacket and stainless steel tube which chills the interior surface of the tube. An independently driven scraping means is placed axially along the length of the inner tube which has a plurality of radial blades contacting the inner surface.

When a heated plastic cheese mass is pumped into such a scraped-surface heat exchange device it is rapidly cooled as it contacts the chilled inner surface of the inner tube. The axially rotating scraping means simultaneously scrapes the cooled product from the chilled inner surface and exposes more product thereto. This continuous mixing and agitation subjects the entire mass to the chilled inner surface which results in an even reduction of temperature throughout the product.

The use of such a scraped-surface heat exchange device in combination with a valve-controlled orifice provides the capability of rapidly and evenly cooling the plastic cheese mass to the desired temperature under controlled pressure which is critical in the instant invention. Moreover, it provides the capability of cooling and extending cheese product in a continuous manner at high rates and at a cost which is economically feasible.

As pointed out hereinbefore, any type of cheese or any blend of a variety of cheeses which can be melted to a plastic or semiplastic condition sufficiently to be extruded can be utilized. However, we have observed that a final product having superior texture and appearance characteristics is obtained by utilizing a cheese formulation which can be classified as either a pasteurized process cheese, pasteurized process cheese food or a pasteurized cheese spread as defined in Title 21, part 19 of the Code of Federal Regulations, which is hereby incorporated by reference.

Preferably, we use a cheese formulation having an analysis of about 40 to 44 percent moisture, 23 to 30 percent fat and a pH of about 5.0 to 6.2. The preferred formulation is made of a blend of Swiss, cheddar, provalone and mozzarella cheese, along with the usual amounts of emulsifier, salt, color and flavoring ingredients, etc. The specific amounts of each cheese utilized will vary greatly from formulation to formulation, depending upon the flavor, texture, body, age, analysis and the like of each variety. It is belived well recognized in the cheese art that even cheeses of the same type or variety have differing flavor, body, age, and texture characteristics and analyses from batch to batch to vat to vat. Hence, the preferred formulation is prepared by blending the preferred varieties in such amounts which will provide a uniform composition with the preferred analysis and will result in a final product exhibiting the superior texture and appearance characteristics described hereinabove after being processed in accordance with the instant invention.

The following examples illustrate the specific embodiments in the invention but the examples are to be considered in an illustrative sense and not in a limitative manner.

EXAMPLE I

A process cheese food formulation was first prepared comprising the following ingredients and amounts:

| Ingredient | | Amount |
|---|---|---|
| Swiss cheese (mellow bodied) | lbs | 130 |
| Low moisture cheddar cheese (firm bodied—barrel curd) | lbs | 225 |
| Provalone cheese (mellow bodied) | lbs | 120 |
| Whey powder | lbs | 9 |
| Skim milk powder | lbs | 9 |
| Sodium citrate (emulsifying salt) | lbs | 17 |
| Salt | lbs | 9 |
| Water (moisture control) | lbs | 45 |
| Marchall #3—annatto color (control color preference) | cc | 300 |

The Swiss and provalone cheese curds were selected to give the blend elasticity to enable the formulation to be compacted while being subjected to pressure. The low moisture cheddar was added to give the blend firmness. The moisture content of the low moisture cheddar cheese was within the range of 36.0–37.0% and was less than one week old. The various cheese curds were ground and blended with the other ingredients, whey powder, emulsifier, salt, water, etc. The mixture was charged into a steam jacketed kettle, heated to 160° F. and held to effect the pasteurization thereof. The heated plastic cheese mass was then dumped into a hopper and pumped by means of a variable speed pump through appropriate conduits into a scraped-surface heat exchange device, manufactured by the Cherry-Burrell Corporation under the trade name Thermutator. As the plastic cheese fomulation passed through the heat exchange device, it was rapidly and evenly cooled under a pressure of 185 p.s.i.g. to a self-sustaining condition throughout having a temperature of about 78–80° F. While the plastic cheese product was being cooled to the desired self-sustaining condition, it was simultaneously agitated by an independently driven scraping means which rotated axially within the heat exchange device. The cheese was then extruded through a valve-controlled orifice of ½ inch diameter at the rate of 250 lbs. per hour to form a continuous, compact bar of product having a corresponding cross-section size. A rotating knife cut the elogated bar into individual snack sized pieces of about 1½ inches in length. The individual pieces of product had an internal and external temperature of approximately 78–80° F. The pieces then passed through a blast chill unit, whereby the temperature of each was reduced approximately 5° F. Finally, a plurality of pieces were stacked in a package and wrapped. Each individual snack size piece had a homogeneous, compacted texture and exhibited no signs of a separation of butterfat globules from the protein mass thereof. The pieces had a flavor substantially similar to cheddar cheese and had an average analysis of 42 percent moisture and 24 percent fat.

EXAMPLE II

A blue cheese flavored process cheese food formulation was prepared by blending Swiss, mozzarella, cheddar and blue cheese curds with the usual amounts of emulsifiers, salt, water and food color to provide the proper analysis. The formulation was ground and heated in a steam jacketed kettle, with agitation, to provide the pasteurization thereof. The heated plastic cheese mass was dumped into a hopper and pumped through appropriate conduits into a scraped-surface heat exchange device as described in Example I. The cheese formulation was rapidly and evenly cooled, with agitation, as it passed through the heat exchange device under a pressure of 165 p.s.i.g. to a temperature of 75–77° F. The cheese was then continuously extruded through a ½ inch valve-controlled orifice at the rate of 400 lbs. per hour, cut and packaged as described in Example I. The resultant individual snack sized pieces of product exhibited surface appearance and texture characteristics substantially similar to the product prepared in Example I except that they were more loosely compacted.

EXAMPLE III

The process cheese food formulation of Example I was prepared and processed into bite sized pieces in accordance with the method disclosed therein with the exception that the heated plastic cheese mass was rapidly and evenly cooled, with simultaneous agitation, under a pressure of 160 p.s.i.g. to a temperature of 78° F. Upon extrusion, the resultant bar of product had a very low density and would not maintain a shape corresponding to the valve-controlled orifice. Furthermore, the resultant self-sustaining bar of product could not be cut into individual snack sized pieces without a serious malformation thereof, each piece being too loosely compacted.

EXAMPLE IV

The process cheese food formulation of Example I was prepared and processed through the steps set forth therein except that the plastic mass was subjected to a pressure of 195 p.s.i.g. during cooling to a temperature of 75 to 77° F. The resultant bite sized pieces of product were highly compacted but had a homogeneous texture and showed no signs of oiling off, i.e. no fat separation.

EXAMPLE V

The process cheese food formulation of Example I was prepared, heated and pumped into a heat exchange device in the same manner as described therein. The plastic mass was rapidly cooled and agitated with the rotating scraping means under a pressure of 200 p.s.i.g. to a temperature of 80° F. and extruded through a ½ inch orifice. It was difficult to extrude the product into a continuous bar for it was highly compacted and tended to break apart immediately after passing through the orifice. When some of the product did extrude through the orifice in the form of a continuous bar and was cut into bite sized pieces, the pieces had very rough surfaces and broke apart easily.

EXAMPLE VI

The process cheese food formulation of Example I was prepared, initially heated and pumped into a scraped-surface heat exchange device as disclosed therein. The heated plastic cheese mass was rapidly cooled as it passed through the heat exchange device under a pressure of 175 p.s.i.g. However, the independently driven scraping means within the device which normally agitates the product during cooling, was shut down. Thus, the product was extruded without any agitation during cooling. Although the extruded product was substantially self-sustaining the temperature varied throughout the product and it would not maintain a shape corresponding the the orifice. The resultant bar of product could not be sliced into individual snack sized pieces without serious malformation of their shape. Furthermore, a significant amount of separation of butterfat globules from the protein mass was observed. After a few minutes of running, the heat exchange device became hopelessly plugged, apparently due to excessive cooling of the cheese mass in contact with the inner surface of the heat exchange device. The individual snack sized pieces appeared to be totally unacceptable from an esthetic point of view.

EXAMPLE VII

A process cheese spread formulation was prepared by blending Swiss, cheddar, provalone and mozzarella cheeses with the usual amounts of emulsifiers, salt, water and other ingredients to provide the proper analysis. The formulation was processed into bite sized pieces of product by the method set forth in Example I. The resultant bite sized pieces of product had texture and appearance characteristics substantially similar to the pieces prepared in Example I except that the instant pieces were softer, apparently due to the increased moisture in the formulation.

Obviously, many modifications and variations of the invention as hereinbefore set forth may be made without departing from the scope of the invention as defined in the appended claims.

We claim:

1. A method for producing a cheese product in a snack sized form, said method comprising: rapidly and evenly cooling to a temperature of from about 70° F. to 85° F. an initially heated plastic cheese formulation selected from the group consisting of process cheese food, process cheese spread and process cheese, so as to sufficiently solidify said formulation to a self-sustaining condition throughout, said formulation being cooled under a pressure of from about 165–195 p.s.i.g. while simultaneously agitating said formulation to reduce the temperature evenly throughout the mass; extruding said cooled cheese formulation through an orifice of up to about 2 inches in size to form a compacted, homogeneous bar of product; and cutting said bar of product into individual snack sized pieces.

2. The method of claim 1 wherein said cheese formulation is extruded through an orifice of about ¼ to 1½ inches in size to form an elongated compacted bar of product having a corresponding cross-section size.

3. The method of claim 2 wherein said elongated bar of product is cut into individual snack sized pieces of about ½ to 1½ inches in length.

4. The method of claim 1 wherein said individual snack sized pieces of product are tempered to reduce the temperature thereof approximately 1 to 10° F., and subsequently packaged.

5. The method of claim 1 wherein said cheese formulation is rapidly and evenly cooled, with agitation, under said pressure and is extruded and cut in a continuous manner.

6. The method of claim 3 wherein said initially heated plastic cheese is rapidly and evenly cooled under a pressure of about 170 to 185 p.s.i.g. to a temperature of about 75 to 80° F.

7. The method of claim 1 wherein the cheese formulation is a process cheese food.

8. The method of claim 1 wherein the cheese formulation is a process cheese spread.

9. The method of claim 1 wherein said cheese formulation is process cheese.

References Cited

UNITED STATES PATENTS

| | | | |
|---|---|---|---|
| 2,228,492 | 1/1941 | Wetherbee | 99—178 |
| 3,072,489 | 1/1963 | Hurlburt et al. | 99—116 |
| 2,015,258 | 9/1935 | Clickner | 99—117 |

DAVID M. NAFF, Primary Examiner

U.S. Cl. X.R.

99—115; 426—518